United States Patent
Gerber (10) Patent No.: US 8,019,675 B1
(45) Date of Patent: Sep. 13, 2011

(54) SYSTEMS AND METHODS FOR ESTABLISHING AND RUNNING AN EXCHANGE TRADED FUND THAT TRACKS THE PERFORMANCE OF A COMMODITY

(75) Inventor: Nicholas D. Gerber, Moraga, CA (US)

(73) Assignee: United States Commodity Funds LLC, Alameda, CA (US)

( * ) Notice: Subject to any disclaimer, the term of this patent is extended or adjusted under 35 U.S.C. 154(b) by 0 days.

(21) Appl. No.: 12/814,793

(22) Filed: Jun. 14, 2010

Related U.S. Application Data (63) Continuation of application No. 11/383,126, filed on May 12, 2006, now Pat. No. 7,739,186.

(60) Provisional application No. 60/680,082, filed on May 12, 2005, provisional application No. 60/680,926, filed on May 13, 2005.

(51) Int. Cl.
    *G06Q 40/00* (2006.01)
(52) U.S. Cl. ............. 705/37; 705/35; 705/36 R; 705/39; 705/44
(58) Field of Classification Search ............... 705/35–45
    See application file for complete search history.

(56) References Cited

U.S. PATENT DOCUMENTS

| | | | |
|---|---|---|---|
| 7,571,130 B2 * | 8/2009 | Weber et al. ................. | 705/36 R |
| 2003/0110107 A1 | 6/2003 | Hiatt, Jr. et al. | |
| 2003/0177077 A1 | 9/2003 | Norman | |
| 2004/0225593 A1 * | 11/2004 | Frankel et al. ................. | 705/37 |
| 2005/0038726 A1 | 2/2005 | Salomon et al. | |
| 2005/0086153 A1 * | 4/2005 | Scott .............................. | 705/37 |
| 2005/0171894 A1 | 8/2005 | Traynor | |
| 2005/0216384 A1 | 9/2005 | Partlow et al. | |
| 2005/0216407 A1 * | 9/2005 | Feldman et al. ................. | 705/42 |
| 2006/0036533 A1 * | 2/2006 | Frankel et al. .................. | 705/37 |

FOREIGN PATENT DOCUMENTS

GB    2352844    2/2001

OTHER PUBLICATIONS

"The Use of New York Cotton Futures Contracts to Hedge Cotton Price Risk in Developing Countries", The World Bank, Policy Research Working Paper Series: 1328, Sudhakar, Elton Thigpen, Panos Varangis, dated 1994.*
Final Office Action for U.S. Appl. No. 11/383,126 dated Aug. 18, 2009.
Notice of Allowance for U.S. Appl. No. 11/383,126 dated Apr. 15, 2010.
Search Report performed by the Scientific & Technical Information Center on Mar. 12, 2010 in reference to U.S. Appl. No. 11/383,126.

* cited by examiner

*Primary Examiner* — Ella Colbert
*Assistant Examiner* — Hai Tran
(74) *Attorney, Agent, or Firm* — Banner & Witcoff, Ltd.

(57) ABSTRACT

Systems and methods are provided for an exchange traded fund (ETF) that tracks the price of one or more commodities. The exchange traded fund may include a commodity pool with units representing ownership interests in the commodity pool. The commodity pool may sell these units to authorized participants, who can subsequently sell these units to or repurchase these units from investors via a stock market exchange. Likewise, the commodity pool can redeem these units from the authorized participants. The commodity pool may be subject to margin requirements. The commodity pool can satisfy this margin requirement by depositing U.S. Treasuries or other cash and near-cash equivalents. In addition, the commodity pool may be substantially non-leveraged such that the assets of the commodity pool do not exceed the assets of the commodity pool. A portion of the non-margined assets may be invested in U.S. Treasuries and other interest-bearing securities.

20 Claims, 4 Drawing Sheets

SYSTEMS AND METHODS FOR ESTABLISHING AND RUNNING AN EXCHANGE TRADED FUND THAT TRACKS THE PERFORMANCE OF A COMMODITY

RELATED APPLICATIONS

The present application is a continuation application of U.S. Non-provisional application Ser. No. 11/383,126, filed on May 12, 2006, and entitled "SYSTEMS AND METHODS FOR ESTABLISHING AND RUNNING AN EXCHANGE TRADED FUND THAT TRACKS THE PERFORMANCE OF A COMMODITY," which claims priority to U.S. Provisional Application Ser. No. 60/680,082, filed May 12, 2005 and entitled "Systems and Methods for Establishing and Running an Exchange Traded Fund that Tracks the Performance of a Commodity" and U.S. Provisional Application Ser. No. 60/680,926, filed May 13, 2005 and entitled "Systems and Methods for Establishing and Running an Exchange Traded Fund that Tracks the Performance of a Commodity." All of the foregoing applications are incorporated herein in their entirety by reference.

FIELD OF THE INVENTION

The present invention relates generally to tracking prices of commodities, and more particularly, to units traded on a stock exchange that track the price of one or more commodities.

BACKGROUND OF THE INVENTION

Generally, commodities are generic, largely unprocessed, goods that can be processed and resold. Commodities that are traded in commodity exchanges for immediate or future delivery include fuels, foodstuffs, and metals. For instance, light, sweet crude oil is traded on the New York Mercantile Exchange (NYMEX). Similarly, foodstuffs can be traded on the Chicago Board of Trade (CBOT) and metals can be traded on the New York Exchange and the London Metal Exchange. Many other commodity exchanges, both domestic and foreign, are available.

Investors, including retail investors, who desire exposure to fluctuations in commodity prices have been traditionally constrained to one of several unsatisfactory options. In particular, exposure to commodities can be difficult for smaller investors because commodities are generally traded in very large quantities, thereby requiring large capital and/or margin requirements. Further, investors may not want to take the delivery of the commodities themselves due to the need to store and secure the commodities.

In view of the constraints described above, investors have traditionally purchased securities (e.g., stocks) of companies that are associated with the commodities. Likewise, investors may purchase shares of mutual funds that invest in a variety of securities of the above-described companies. However, the prices of these securities are oftentimes affected by many more factors than the price of the underlying commodities themselves. In recent years, corporate fraud has bilked investors out of millions, if not billions, of dollars. Likewise, poor management can reduce the value of a company even while the price of the underlying commodity may be rising. Moreover, in the case of mutual fund shares, investors do not have the full liquidity of individual securities since redemptions are typically performed at the close of a trading day once the mutual fund's Net Asset Value (NAV) has been determined Accordingly, there is a need in the industry for units tradable on a stock market exchange, where the units provide a more direct exposure to the price fluctuations of an underlying commodity such as oil.

SUMMARY OF THE INVENTION

According to an embodiment of the present invention, there is a method for operating an exchange traded fund. The method includes creating a commodity pool that includes a plurality of units representing an equity interest in the commodity pool and selling at least a portion of the units to an authorized participant, where the units sold to the authorized participant are tradable on a stock market exchange. The method also includes purchasing one or more short-term oil futures contracts via a commodity exchange using at least a first portion of the proceeds from the sale of the units to the authorized participant.

According to an aspect of the present invention, the method may further include conducting trades in short-term oil futures contracts so that the average change in the net asset value (NAV) of the units is within about 5 to 15 percent of the average change in price of the oil futures contract over a period of about one month. Accordingly, the NAV of the units may closely track a spot price of oil. According to another aspect of the present invention, the method may further include purchasing interest-bearing securities using at least a second portion of the proceeds. These interest-bearing securities may be U.S. Treasuries. In addition, a portion of the interest-bearing securities may be provided for margin associated with the purchase of the short-term oil futures contracts. According to another aspect of the present invention, the short-term oil futures contracts may have a term of about one month or less. According to another aspect of the present invention, the commodity pool can be structured as a limited partnership, a trust, a corporation, or a limited liability company. According to yet another aspect of the present invention, the method may further include redeeming at least a portion of the units when presented by the authorized participant for redemption. According to another aspect of the present invention, the stock market exchange may be one or more of the American Stock Exchange (AMEX), the New York Stock Exchange (NYSE), and the Nasdaq, and the commodity exchange may be the New York Mercantile Exchange (NYMEX).

According to another embodiment of the present invention, there is a computerized system for operating a commodity pool. The system includes a processor for executing programmed logic, a communication module for receiving pricing information associated with short-term oil futures contracts and a first memory in communication with the processor for storing the pricing information associated with short-term oil futures contracts. The system further includes a second memory in communication with the processor, where the second memory includes executable programmed logic for determining a number of outstanding units of a commodity pool, determining a value of investments of the commodity pool based at least in part on the received pricing information associated with the short-term oil futures contracts, determining expenses for the commodity pool, and calculating a net asset value for the commodity pool based upon the determined number of outstanding units, the determined value of the investments, and the determined expenses.

According to an aspect of the present invention, the investments of the commodity pool may include short-term oil futures contracts and interest-bearing securities. These short-term oil futures contracts may have a term of about one month or less. According to another aspect of the present invention, the communication module may receives pricing information associated with oil futures contracts from a pricing mechanism of a commodity exchange. According to yet another aspect of the present invention, the second memory may include executable programmed logic for calculating a creation basket price and a redemption basket price for the commodity pool units.

According to yet another embodiment of the present invention, there is an investment method for an exchange traded fund. The method includes investing in short-term oil futures contracts, where the value of the short-term oil futures contracts does not exceed an asset value of a commodity pool and where the commodity pool includes a plurality of units tradable on a stock market exchange, providing a first portion of the asset value of the commodity pool for margin requirement associated with the short-term oil futures contract, and investing in interest-bearing securities using a second portion of the asset value of the commodity pool, where an average change in a net asset value (NAV) of the commodity pool is within about 5 to 15 percent of the average change in price of the short-term oil futures contract over a period of about one month.

According to an aspect of the present invention, the short-term oil futures oil futures contracts may be exchanged for second short-term futures contracts prior to a delivery date associated with the short-term oil futures contracts. The short-term oil futures contracts may include oil futures contracts with terms of about a month or less. According to another aspect of the present invention, the NAV of the units closely track a spot price of oil. According to another aspect of the present invention, the method further includes at least one of investing in short positions associated with oil and taking possession of oil.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention is described below with reference to block diagrams and flowchart illustrations of systems, methods, apparatuses and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

System Overview

Figure 1:
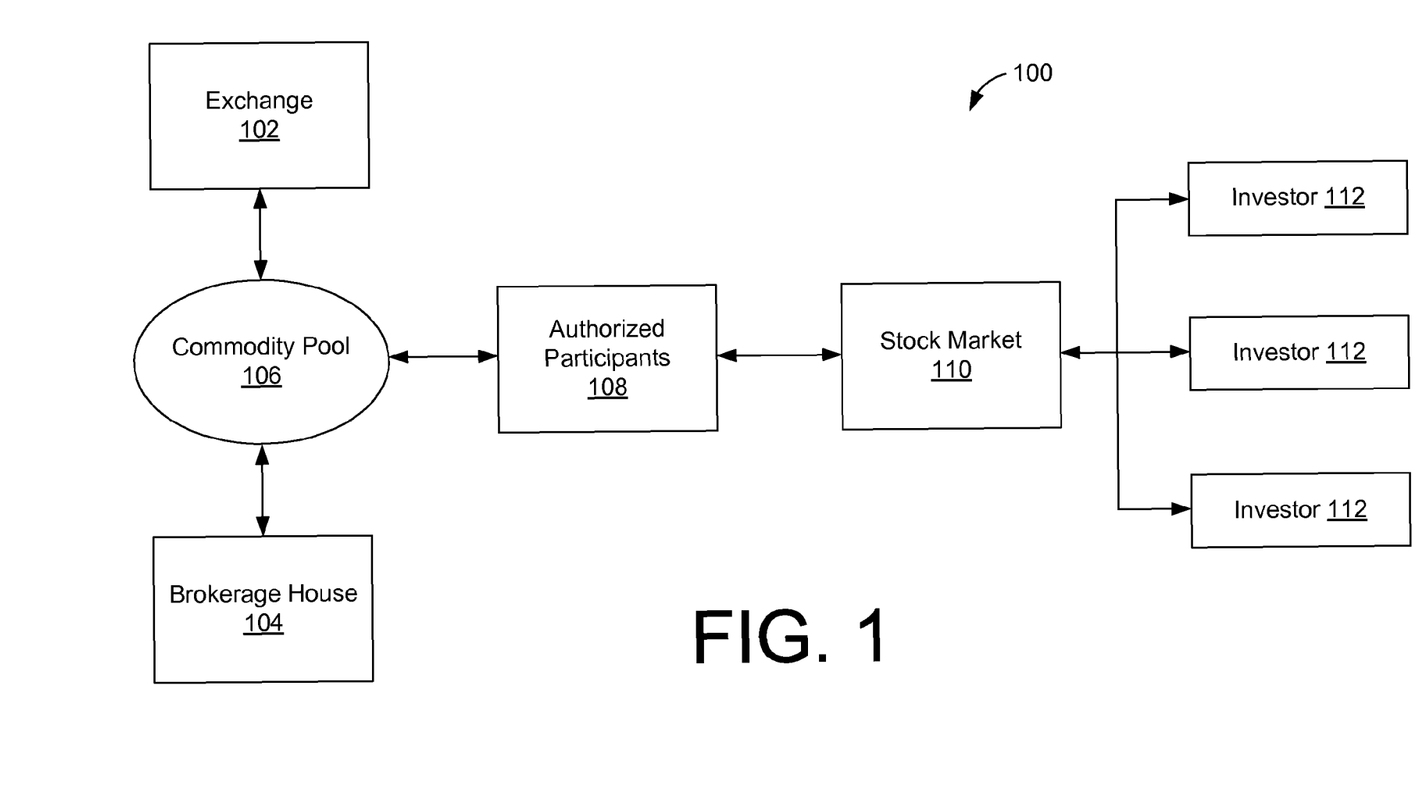
FIG. 1 illustrates an overview of an exemplary system for providing a plurality of units that each track the price of a commodity, according to an embodiment of the present invention.

With reference to FIG. 1, illustrated is an overview of a system 100 for providing a plurality of units that track the price of a commodity, where the units are traded on a stock market exchange. The system 100 includes one or more commodity exchanges 102, brokerage houses 104, commodity pools 106, authorized participants 108, stock market exchanges 110, and investors 112.

The components illustrated in the system 100 of FIG. 1 will now be described in further detail according to an exemplary embodiment of the present invention. As illustrated in FIG. 1, there is a commodity pool 106, which may act in accordance with an exchange traded fund (ETF). The commodity pool 106 may be an entity, perhaps in the form of a partnership, trust, corporation, or limited liability company, operated for trading commodity futures contracts, options contracts, and other investment instruments associated one or more exchanges 102. According to one embodiment of the present invention, the commodity pool 106 may be a limited partnership, which includes at least one general partner and at least one limited partner. The general partner has unlimited personal liability while a limited partner's liability is limited to the amount of investment in the commodity pool 106. The general partner can be a corporation, including a limited liability corporation, according to an exemplary embodiment of the present invention. In addition, the use of a limited partnership may provide for pass-through tax treatment.

The commodity pool 106 may place trade orders (e.g., purchase or sell orders) with one or more exchanges 102. The exchange 102 can be one or more commodity exchanges or futures markets, which may include the New York Mercantile Exchange (NYMEX), the Chicago Board of Trade (CBOT), the New York Board of Trade, the Chicago Mercantile Exchange, LIFFE, the Sydney Futures Exchange, TOCOM, IPE, EUREX, and other such similar exchanges. In addition, the commodity pool 106 may place U.S. Treasury and other investment orders with one or more brokerage houses 104. Thus, the brokerage houses 104 may provide the commodity pool 106 with access to a variety of interest or dividend bearing securities, including bonds and treasury securities, as well as stocks and mutual funds.

As described in further detail below, the commodity pool 106 sells and redeems its units (e.g., shares) via one or more authorized participants 108, which may also include market makers. The authorized participants 108 may be registered broker-dealers or other securities market participations, including banks and other financial institutions, that are not required to register as broker-dealers or other securities market participants to engage in securities transactions. In addition, the authorized participants 108 can also include DTC ("Depository Trust Company") participants. Generally, the authorized participants 108 have entered into prearranged agreements with the commodity pool 106. For example, if the commodity pool 106 is structured as a limited partnership, then the authorized participants 108 may enter into prearranged agreements with the general partner of the limited partnership.

These authorized participants 108 can sell the commodity pool's 106 units to investors 112 or purchase the commodity pool's 106 units from investors 112 via the stock market exchange 110. The stock market exchange 110 may include the New York Stock Exchange (NYSE), the American Stock Exchange (AMEX), the Nasdaq, the London Stock Exchange (LSE), and a variety of other stock market exchanges, both domestic and foreign. The investors 112 can be individuals, mutual funds, pension funds, educational savings funds, and a variety of other entities with access, either directly or indirectly via a brokerage house, to the stock market exchange 110.

One of ordinary skill in the art will recognize that the system 100 of FIG. 1 has been illustrated in a simplified form and that other components may be present. For example, the system 100 can also include a futures commission merchant (FCM) that places trades for the commodity pool 106 on the exchange 102. Likewise, the commodity pool 106 may include or otherwise be associated with a custodian that has legal responsibility, both in management and safekeeping, of the commodity pool's 106 securities. Further, the commodity pool 106 may include an administrator, which acts to assist in or direct the issuance of the commodity pool's 106 units.

Creation Baskets and Redemption Baskets

Figure 2A:
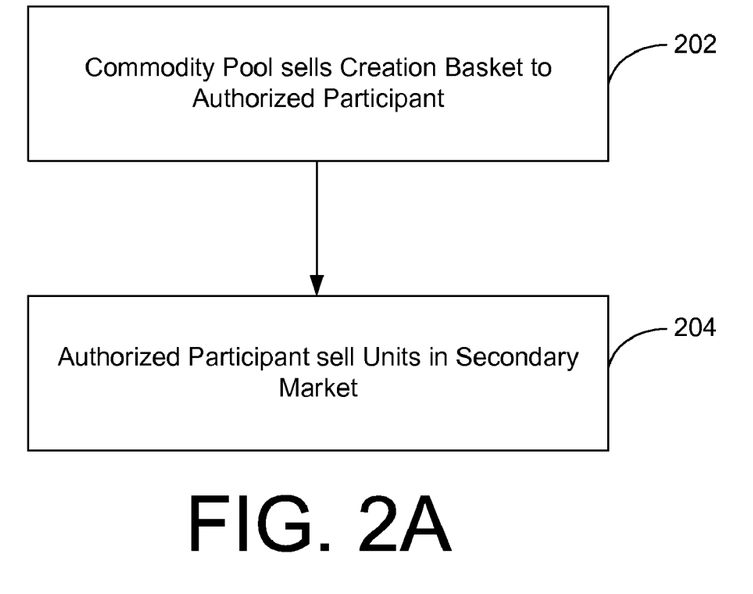
FIGS. 2A and 2B illustrate exemplary flow diagrams associated with creation baskets and redemption baskets, respectively, according to an embodiment of the present invention.

In accordance with an embodiment of the present invention, the commodity pool 106 will be an exchange traded fund (ETF), whose issued units will trade on the stock market exchange 110. These units may represent fractional undivided beneficial interests in and ownership of the commodity pool 106. Referring to FIG. 2A, the commodity pool 106 sells and/or issues one or more creation baskets to an authorized participant 108, as illustrated in block 202. Each creation basket may include 100,000 units, although more or fewer units may be included for other embodiments of the present invention. The payment price (e.g., unit net asset value (NAV) plus any fees) for the creation baskets will typically be published by the commodity pool 106 on a periodic basis. The proceeds obtained from selling the creation baskets can be invested by the commodity pool 106, as described below. As illustrated in block 204, after depositing the units with the Depository Trust Company (DTC), the authorized participant 108 may sell the purchased units to one or more investors 112 on a secondary market such as the stock market exchange 110. Alternatively, in block 204, the authorized participant 108 may offer the units directly to investors 112, which can also include brokers.

According to an embodiment of the present invention, individual certificates may not be issued for the units if the commodity pool 106 is structured as a limited partnership. Instead, units will be represented by one or more global certificates, which will be deposited by the commodity pool's 106 custodian with the DTC. These global certificates may evidence all of the units outstanding at any time.

Holders of these units may be one of the following: (1) participants in DTC such as banks, brokers, dealers, and trust companies (DTC participants), (2) those who maintain, either directly or indirectly, custodial relationship with a DTC participant (indirect participants), and (3) those banks, brokers, dealers, trust companies, and others who hold interest in the units through DTC participants or indirect participants. DTC participants acting on behalf of investors 112 holding units through such participants' accounts in DTC may follow the delivery practice applicable to securities eligible for DTC's Same-Day Funds Settlement System.

Figure 2B:
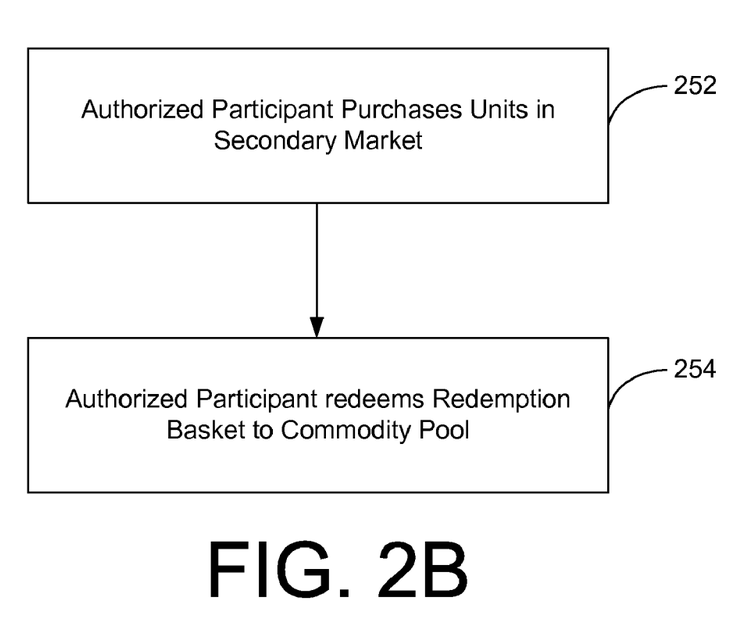

Referring in FIG. 2B, according to another embodiment of the present invention, the commodity pool 112 also may redeem its issued units according to the redemption price (e.g., unit net asset value (NAV) plus any fees) published by the commodity pool 112. In particular, an authorized participant 108 can purchase units of the commodity pool 112 in the secondary market, such as stock market exchange 110. Once the authorized participant 108 has accumulated enough units to form a redemption basket, the authorized participant 108 may redeem the redemption basket with the commodity pool 106. As with the creation basket, each redemption basket may include 100,000 units, although more or fewer units may be included for other embodiments of the present invention.

Commodity Pool Investment Methodology

In accordance with an embodiment of the present invention, the commodity pool 106 may include a plurality of units whose NAV reflect the performance of the spot price of one or more types of commodities (e.g., oil), less expenses. The spot price may be the price for a cash market transaction for immediate delivery of a commodity such as oil.

An investment methodology of a commodity pool 106 that invests in oil will be discussed with reference to FIG. 3. As discussed above, the commodity pool 106 may invest proceeds obtained from selling creation baskets to authorized participants 108. As shown in block 302 of FIG. 3, the commodity pool 106 may invest in oil futures contracts, which may include futures contracts for light, sweet crude oil, other types of crude oil, heating oil, gasoline, natural gas, and other petroleum-based fuels. The commodity pool 106 purchases these oil futures contracts from the commodity exchange 102 (e.g., NYMEX, etc.) via a futures commission merchant (FCM).

The futures commission merchant (FCM) may be the custodian for the oil futures contracts purchased by the commodity pool 106. The oil futures contracts may be standardized contracts traded on the NYMEX that call for the future delivery of a specified quantity at specified times and places. For example, the oil futures contract may be for West Texas Intermediate ("WTI") light, sweet crude oil delivered to Cushing, Okla. According to an exemplary embodiment of the present invention, the terms and/or delivery dates of the oil futures contracts may be relatively short, perhaps about a month out or less.

Figure 3:
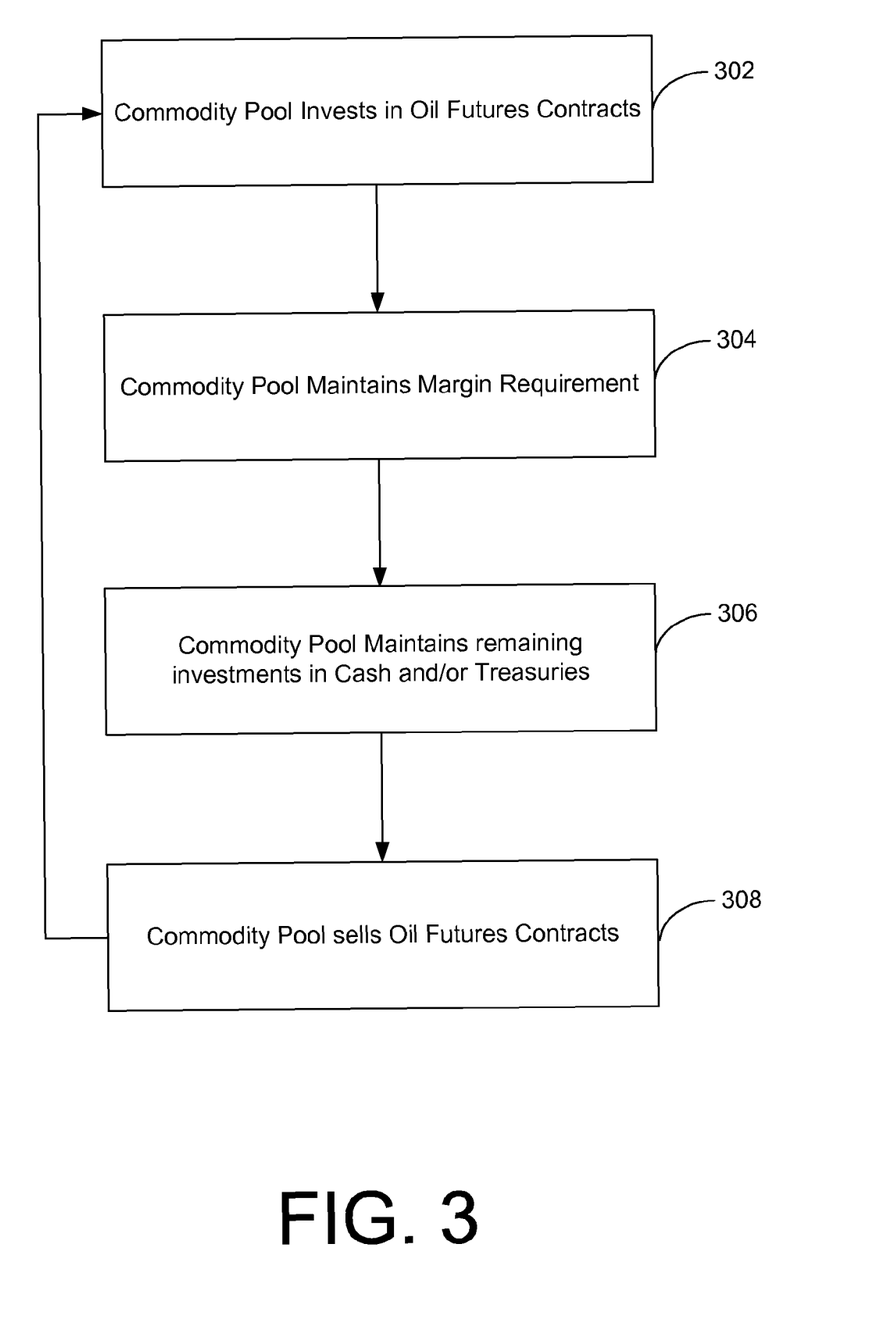
FIG. 3 illustrates an exemplary investment methodology of a commodity pool, according to an embodiment of the present invention.

Referring to block 304 of FIG. 3, when the commodity pool 106 purchases an oil futures contract from the futures commission merchant (FCM), the FCM may not require payment of the full contract price. Instead, the commodity pool 106 can purchase the oil futures contract on margin supplied by the FCM. Margin is the amount of equity required for an investment that is made on credit supplied by the FCM. According to an exemplary embodiment of the present invention, this margin requirement may between 2% and 10% of the oil futures contract price. For example, the commodity pool's 106 purchase of an oil futures contract with a stated value of $10 million would not require the commodity pool 106 to pay $10 million upon entering the contract. Rather, only a margin deposit, perhaps 5% of the stated value of the oil futures contract ($500,000), would be required.

The commodity pool 106 can satisfy the margin requirement described above by purchasing U.S. Treasury securities via a brokerage house 104 and depositing those Treasury securities with the FCM. Additional margin, or less margin, may be needed if the value of the oil futures contracts fluctuate. These U.S. Treasury securities used for satisfying the margin requirement may be shorter-term securities, according to an exemplary embodiment of the present invention. These U.S. Treasury securities may earn interest income for the commodity pool 106. One of ordinary skill in the art will recognize that cash, bonds, and other interest-bearing securities can be deposited with the FCM without departing from embodiments of the present invention.

According to an embodiment of the present invention, the commodity pool 106 may be substantially non-leveraged. In this exemplary situation, the commodity pool 106 would retain enough assets to satisfy the contract value of all of the purchased oil futures contracts in block 302. Accordingly, after satisfying the margin requirements in block 304, the commodity pool 106 may maintain the remaining assets in cash and/or near-cash equivalents (e.g., U.S. Treasuries, bonds, etc.), as illustrated in block 306. Although the cash and/or near-cash equivalents (and including the margin requirement in block 304) are generally denominated in U.S. dollars, the commodity pool 106 can also maintain cash and/or near-cash equivalents in foreign currency, including Euros, Yen, etc. Such foreign currency may facilitate the purchases of oil futures contracts on foreign exchanges 102. In addition, the commodity pool 106 may keep a particular amount of the cash and/or near-cash equivalents for any expected redemption of redemption baskets (e.g., 100,000 units) and/or payment of dividends.

Because the oil futures contracts purchased in block 302 may be short term (e.g., month, near month or less), the commodity pool 106 generally chooses to rollover existing oil futures contracts prior to their expiration/delivery date instead of actually taking possession of the oil. Accordingly, as illustrated in block 308, the commodity pool 106 may sell the oil futures contract prior to their end-of-month expiration/delivery date. The proceeds from the sale of the oil futures contacts can then be applied to the purchase of new short term oil futures contracts, as illustrated in block 302. If at the time of purchase of the new oil futures contract, the current spot price of oil exceeds the forward prices reflected in the oil futures contract, then this may be known as a backwardation. This may reflect a near-term oil supply problem. With a backwardation, the commodity pool 106 may be able to increase the amount of oil futures contracts purchased in block 302. In contrast to a backwardation, a contango occurs where the forward prices reflected in the oil futures contracts exceeds the spot price. With a contango, the commodity pool 106 may purchase fewer oil futures contracts, as illustrated in block 302. In some embodiments of the present invention, the commodity pool may perform certain hedging and/or arbitrage activities such that the commodity pool's NAV more closely matches the spot price of oil during certain conditions, including during a contango. For instance, the commodity pool 106 may take short positions in an oil interest or take actual possession of the oil, either directly or via a third-party, for resale at a future date, according to exemplary embodiments of the present invention.

One of ordinary skill in the art will recognize that the commodity pool 106 can invest in other instruments besides the oil futures contracts described above. For instance, the commodity pool 106 can also invest in options on futures contracts, forward contracts for oil, spot contracts, and swap contracts. A forward contract for oil may be a supply contract between principals, not traded on an exchange 102, to buy or sell a specified quantity of oil at or before a specified date at a specified price. An option on an oil futures contract, forward contract, or oil on the spot market may give the buyer of the option the right, but not the obligation, to buy or sell a futures contract, forward contract, or oil as applicable, at a specified price on or before a specified date. Options on futures contracts may be standardized contracts traded on an exchange 102, while options on forward contracts and commodities, referred to collectively in this application as over-the-counter options, generally are individually negotiated, principal-to-principal contracts not traded on an exchange 102. A spot contract may be a cash market transaction in which the buyer and seller agree to the immediate purchase and sale of oil, usually with a two-day settlement. However, spot contracts are not uniform and generally not exchange-traded. In addition, a swap contract may be an over-the-counter negotiated contract that generally involves an exchange of a stream of payments between the contracting parties. Swap contracts generally are not uniform and not exchange-traded.

In addition to the investment instruments described above, the commodity pool 106 may also utilize a variety of investment methodologies in conjunction with the investment instructions, including spreads, straddles, and pyramiding. Spreads and straddles are futures trading transactions that involve the simultaneous buy and selling of a particular futures contract in the same or a related commodity but involving different delivery dates. The use of spreads and straddles may allow the commodity pool 106 to earn profits from a widening or narrowing movement of the two prices of the futures contracts. In addition, pyramiding may allow the commodity pool 106 to use unrealized profits from existing positions as variation margin for the purchase or sale of additional positions in the same or other commodity interest. Many other investment instruments will be known to one of ordinary skill in the art.

Operation of the Commodity Pool

The operation of the commodity pool 106 will now be discussed in further detail. According to an embodiment of the present invention, the commodity pool 106 may seek to have each of its unit's net asset value (NAV) to reflect the performance price of light, sweet crude oil, less the commodity pool's 106 expenses. These expenses may be a percentage of the commodity pool's 106 assets. For example, these expenses may be 0.50% of the commodity pool's 106 NAV for the first $1 billion of assets and 0.20% of the NAV after the first $1 billion of assets.

As described above, the commodity pool's 106 NAV may closely track the performance of oil futures contracts the commodity pool 106 invests in. In particular, the commodity pool 106 may make trades in oil futures contracts and other investments such that A is within approximately 5-15%, or more particularly 10%, of B, where A is the average daily change in the commodity pool's 106 NAV for any period of about 30 successive valuation days (any day as of which the commodity pool 106 calculates its NAV), and B is the average daily change in the price of oil futures contract over the same period. For this particular determination, "oil futures contract" may refer to near-month oil futures contract, except that on each valuation day within the two week period preceding a monthly expiration date, "oil futures contract" may means the one month out oil futures contract. Because the price of oil futures contracts typically tracks the spot price of light, sweet crude oil, the commodity pool's 106 units may closely track the spot price of light, sweet crude oil, less the expenses of the commodity pool 106.

Figure 4:
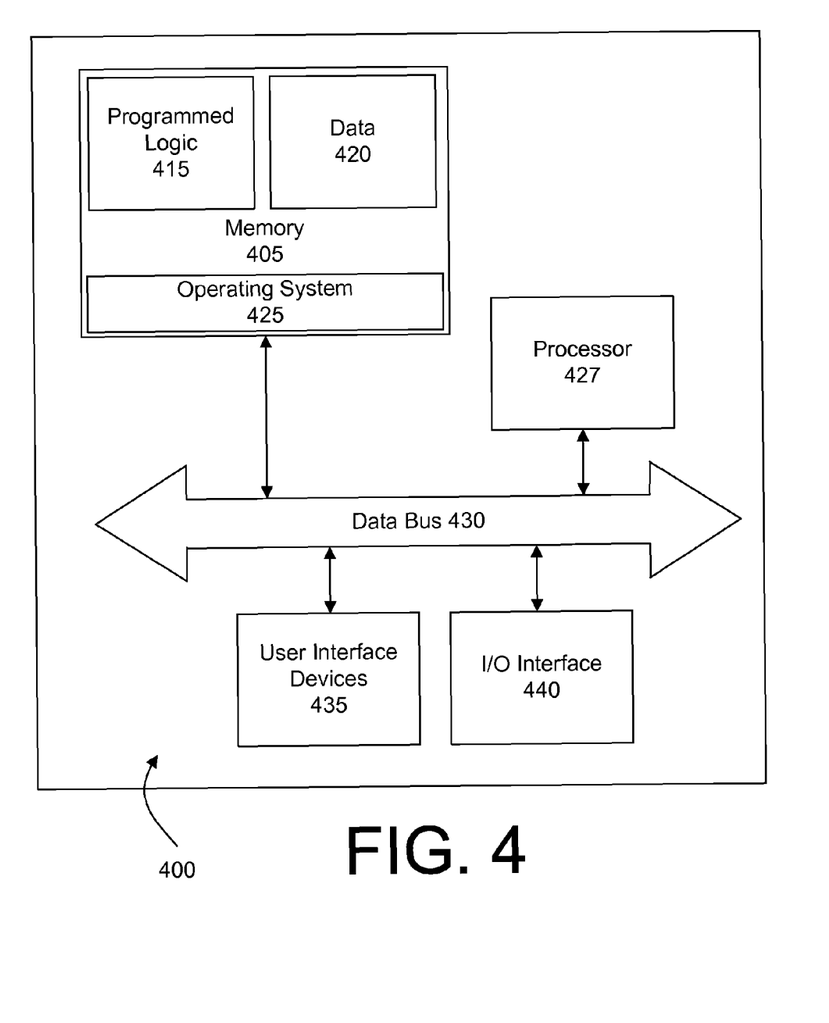
FIG. 4 illustrates an exemplary control unit utilized by a commodity pool, according to an embodiment of the present invention.

The commodity pool 106 may provide periodic updates of its net asset value (NAV), creation basket price, and redemption basket price during periodic intervals. FIG. 4 illustrates a control unit 400 that may be utilized in a method and system for providing such net asset values, creation basket prices, and redemption basket prices, according to an illustrative embodiment of the present invention. The control unit 400 may include a memory 405 that stores an operating system 425, programmed logic 415 (e.g., software, executable instructions, etc.), and data 420, in accordance with an embodiment of the present invention. The data 420 may include quotes for oil futures contracts provided by one or more exchanges 102 and/or quotes for U.S. Treasury prices/bonds from one or more brokerage houses 104. The programmed logic 415 may provide one or more exemplary algorithms for calculating the net asset value (NAV) for the commodity pool 106 units based at least in part on the received quotes for oil futures contract stored as data 420. In particular, this algorithm for calculating the NAV may include taking the current market value of the commodity pool's 106 assets (e.g., oil future contracts, Treasuries, etc.), subtracting any liabilities, and dividing the remaining amount by the total number of units issued and outstanding for the commodity pool 106. In addition, the programmed logic 415 may include one or more algorithms for determining the commodity pool's 106 creation basket prices and/or redemption basket prices.

A processor 427 may utilize the operating system 425 to execute the programmed logic 415. A data bus 430 may provide communication between the memory 405 and the processor 427. Users may interface with the control unit 400 via a user interface device(s) 435 such as a keyboard, mouse, control panel, or any other devices capable of communicating digital data to the control unit 400. The control unit 400 includes an I/O Interface 440 (i.e., communication module) for receiving the quotes for the oil futures contracts from one or more pricing mechanisms of the exchanges 102. In addition, the I/O Interface 440 may be utilized for transmitting and publishing the net asset value (NAV) for the commodity pool 106, the creation basket prices, and the redemption basket prices. Further the control unit 400 and the programmed logic 415 implemented thereby may comprise software, hardware, firmware or any combination thereof.

According to an exemplary embodiment of the present invention, the control unit 400 may calculate the commodity pool's 106 NAV periodically, perhaps periodically during each trading day on the stock market exchange 110, although other embodiments may calculate the NAV at the close of the stock market exchange 110 or commodity exchange 102. If the stock market exchange 110 is the NYSE, the Nasdaq, or the AMEX, then the normal trading hours may be between 9:30 am EST and 4:00 pm EST. However, because the pricing of oil contracts occurs via the commodity exchange 102, the NAV may be more accurate during the commodity exchange's 102 trading hours. If the commodity exchange 102 is the NYMEX, then the normal trading hours may be between 10:00 am EST and 2:30 pm EST.

In addition, the stock market exchange 110 may calculate an indicative optimized portfolio value (IOPV) for the commodity pools' 106 units on an intra-day basis, perhaps every 15 minutes while the commodity pools' 106 units are being traded on the stock market exchange 110. The IOPV may be published under a separate symbol periodically, perhaps every 15 seconds, and calculated through the trading day based upon the last sale prices of the securities specified for creation or redemption plus any estimate cash amounts associated with the creation unit, all on a per-ETF share basis. The IOPV may give investors 112 a sense of the relationship between a basket of securities that are representative of those owned in the commodity pool 106 and its per-unit price on an intraday basis.

Alternative Commodity Pool Structure

In accordance with an exemplary embodiment of the present invention, the commodity pool 106 may include at least two separate pools. More specifically, the commodity pool 106 may include an investing pool and a public pool. The investing pool may invest in the oil futures contracts and Treasuries, as described above with respect to the commodity pool 106. The public pool may invest in the investing pool, and the units of the public pool are offered to and redeemed from the authorized participants 108 according to the creation and redemption baskets described above.

Many modifications and other embodiments of the inventions set forth herein will come to mind to one skilled in the art to which these inventions pertain having the benefit of the teachings presented in the foregoing descriptions and the associated attachments. Therefore, it is to be understood that the inventions are not to be limited to the specific embodiments disclosed and that modifications and other embodiments are intended to be included within the scope of the present disclosure. Although specific terms are employed herein, they are used in a generic and descriptive sense only and not for purposes of limitation.

That which is claimed:

1. A method, comprising:
   calculating, by a computing device, a net asset value of a commodity pool that includes a plurality of commodity instruments associated with a particular commodity, the calculating being based on a number of currently outstanding ownership interests in the commodity pool, a current value of the plurality of commodity interests, and an amount of expenses of the commodity pool; and
   in response to a spot price for a first set of one or more futures contracts included in the plurality of commodity instruments being less than a forward price for a second set of one or more futures contracts associated with the particular commodity, determining, by the computing device, to perform hedging and/or arbitrage activities to maintain the calculated net asset value of the commodity pool within a predetermined range in selling the first set of one or more futures contracts to purchase the second set of one or more futures contracts,
   wherein the second set of one or more futures contracts has a later expiration date than the first set of one or more futures contracts.

2. The method of claim 1, wherein one or more of the currently outstanding ownership interests in the commodity pool is traded in a secondary market.

3. The method of claim 1, wherein the plurality of commodity instruments included in the commodity pool comprises one or more futures contracts and one or more instruments selected from the group including: options on futures contracts, forward contracts, spot contracts, and swap contracts.

4. The method of claim 1, wherein one or more futures contracts of the second set of futures contracts are purchased on margin using at least one interest-bearing instrument to satisfy at least one associated margin requirement.

5. The method of claim 1, wherein the particular commodity is oil.

6. The method of claim 1, wherein the first set of one or more futures contracts has a term of one month or less.

7. The method of claim 1, wherein determining to perform hedging and/or arbitrage activities includes: maintaining, by the computing device, the calculated net asset value of the commodity pool such that during a predetermined period of time, an average daily change of the net asset value of the commodity pool is within ten percent of an average daily change of a price of the particular commodity.

8. One or more non-transitory computer-readable media having computer-executable instructions stored thereon that, when executed, cause at least one processor to:
  calculate a net asset value of a commodity pool that includes a plurality of commodity instruments associated with a particular commodity, the calculating being based on a number of currently outstanding ownership interests in the commodity pool, a current value of the plurality of commodity interests, and an amount of expenses of the commodity pool; and
  in response to a spot price for a first set of one or more futures contracts included in the plurality of commodity instruments being less than a forward price for a second set of one or more futures contracts associated with the particular commodity, determine to perform hedging and/or arbitrage activities to maintain the calculated net asset value of the commodity pool within a predetermined range in selling the first set of one or more futures contracts to purchase the second set of one or more futures contracts,
  wherein the second set of one or more futures contracts has a later expiration date than the first set of one or more futures contracts.

9. The one or more computer-readable media of claim 8, wherein one or more of the currently outstanding ownership interests in the commodity pool is traded in a secondary market.

10. The one or more computer-readable media of claim 8, wherein the plurality of commodity instruments included in the commodity pool comprises one or more futures contracts and one or more instruments selected from the group including: options on futures contracts, forward contracts, spot contracts, and swap contracts.

11. The one or more computer-readable media of claim 8, wherein one or more futures contracts of the second set of futures contracts are purchased on margin using at least one interest-bearing instrument to satisfy at least one associated margin requirement.

12. The one or more computer-readable media of claim 8, wherein the particular commodity is oil.

13. The one or more computer-readable media of claim 8, wherein the first set of one or more futures contracts has a term of one month or less.

14. The one or more computer-readable media of claim 8, wherein determining to perform hedging and/or arbitrage activities includes: maintaining the calculated net asset value of the commodity pool such that during a predetermined period of time, an average daily change of the net asset value of the commodity pool is within ten percent of an average daily change of a price of the particular commodity.

15. An apparatus, comprising:
  at least one processor; and
  memory storing computer-readable instructions that, when executed by the at least one processor, cause the apparatus to:
    calculate a net asset value of a commodity pool that includes a plurality of commodity instruments associated with a particular commodity, the calculating being based on a number of currently outstanding ownership interests in the commodity pool, a current value of the plurality of commodity interests, and an amount of expenses of the commodity pool; and
    in response to a spot price for a first set of one or more futures contracts included in the plurality of commodity instruments being less than a forward price for a second set of one or more futures contracts associated with the particular commodity, determine to perform hedging and/or arbitrage activities to maintain the calculated net asset value of the commodity pool within a predetermined range in selling the first set of one or more futures contracts to purchase the second set of one or more futures contracts,
    wherein the second set of one or more futures contracts has a later expiration date than the first set of one or more futures contracts.

16. The apparatus of claim 15, wherein one or more of the currently outstanding ownership interests in the commodity pool is traded in a secondary market.

17. The apparatus of claim 15, wherein the plurality of commodity instruments included in the commodity pool comprises one or more futures contracts and one or more instruments selected from the group including: options on futures contracts, forward contracts, spot contracts, and swap contracts.

18. The apparatus of claim 15, wherein one or more futures contracts of the second set of futures contracts are purchased on margin using at least one interest-bearing instrument to satisfy at least one associated margin requirement.

19. The apparatus of claim 15, wherein the first set of one or more futures contracts has a term of one month or less.

20. The apparatus of claim 15, wherein determining to perform hedging and/or arbitrage activities includes: maintaining the calculated net asset value of the commodity pool such that during a predetermined period of time, an average daily change of the net asset value of the commodity pool is within ten percent of an average daily change of a price of the particular commodity.

* * * * *